United States Patent [19]

Lewis, Jr. et al.

[11] Patent Number: 4,897,183
[45] Date of Patent: Jan. 30, 1990

[54] LITTER SCREENING AND SEPARATING APPARATUS

[75] Inventors: Robert L. Lewis, Jr.; Carl J. Thomas, both of Baxley, Ga.

[73] Assignee: Lewis Bros. Mfg. Inc., Baxley, Ga.

[21] Appl. No.: 60,325

[22] Filed: Jun. 10, 1987

[51] Int. Cl.⁴ .......................... B07B 1/00; B07B 1/10
[52] U.S. Cl. ...................................... 209/235; 119/1;
198/631; 198/690.2; 198/698; 198/851;
209/308; 209/381; 209/399; 209/420; 414/502
[58] Field of Search .................. 56/327.1; 209/2, 307,
209/308, 235, 257, 420, 421, 236, 397, 399, 255,
257, 382, 381, 254, 935; 414/502, 528, 300;
198/851, 850, 690.2, 698, 631, 494, 803.1, 803.2,
844; 119/1, 22; 171/124, 126, 127, 132, 135

[56] References Cited

U.S. PATENT DOCUMENTS

| | | | |
|---|---|---|---|
| 9,432 | 11/1852 | Moffitt | 209/308 |
| 193,866 | 8/1877 | Gordon | 209/308 X |
| 627,274 | 6/1899 | Selleck | 198/851 X |
| 936,162 | 10/1909 | Pringle | 209/308 |
| 1,310,645 | 7/1919 | Beach | 209/307 |
| 2,010,335 | 8/1935 | Stoltenberg | 209/307 |
| 2,104,785 | 1/1938 | Akeyson | 209/308 |
| 2,363,682 | 11/1944 | Madsen et al. | 209/308 |
| 2,743,829 | 5/1956 | Ballard | 414/528 |
| 2,821,961 | 2/1958 | Mercoli | 209/235 |
| 3,083,810 | 4/1963 | Zebarth et al. | 198/698 |
| 3,263,257 | 8/1966 | Stapleton | 414/502 X |
| 3,316,977 | 5/1967 | Snook | 209/307 |
| 3,412,943 | 11/1968 | Lewis et al. | 198/518 |
| 3,621,997 | 11/1971 | Hobbs | 209/307 X |
| 3,721,214 | 3/1973 | Staples | 119/22 |
| 4,055,265 | 10/1977 | Eisenman | 198/844 X |
| 4,167,999 | 9/1979 | Haggerty | 198/85 X |
| 4,711,403 | 12/1987 | Gregory, Sr. et al. | 119/22 X |
| 4,741,431 | 5/1988 | Whitehead | 198/844 |

*Primary Examiner*—Donald T. Hajec
*Attorney, Agent, or Firm*—Kimmel, Crowell & Weaver

[57] ABSTRACT

A litter screening and separating apparatus including a storage compartment arranged for towed movement, a loader structure affixed at one end of the storage compartment for picking up encrusted litter material from floors of chicken houses, a conveyor including a pair of chains for moving the encrusted litter from the loading structure to the storage compartment, a baffle plate adjacent and beneath the conveyor chain for preventing contamination of the conveyor chain from the material stored in the storage compartment, a plurality of loading panels arranged between the pair of chains and being replaceably affixed thereto, and vibrator rollers adjacent the pair of chains for engagement with projections on spaced links of each chain for vibrating the loading panels. The loading panels may be of solid panel construction or of expanded metal, depending upon the type of litter being picked up and the method of use of the apparatus.

10 Claims, 2 Drawing Sheets

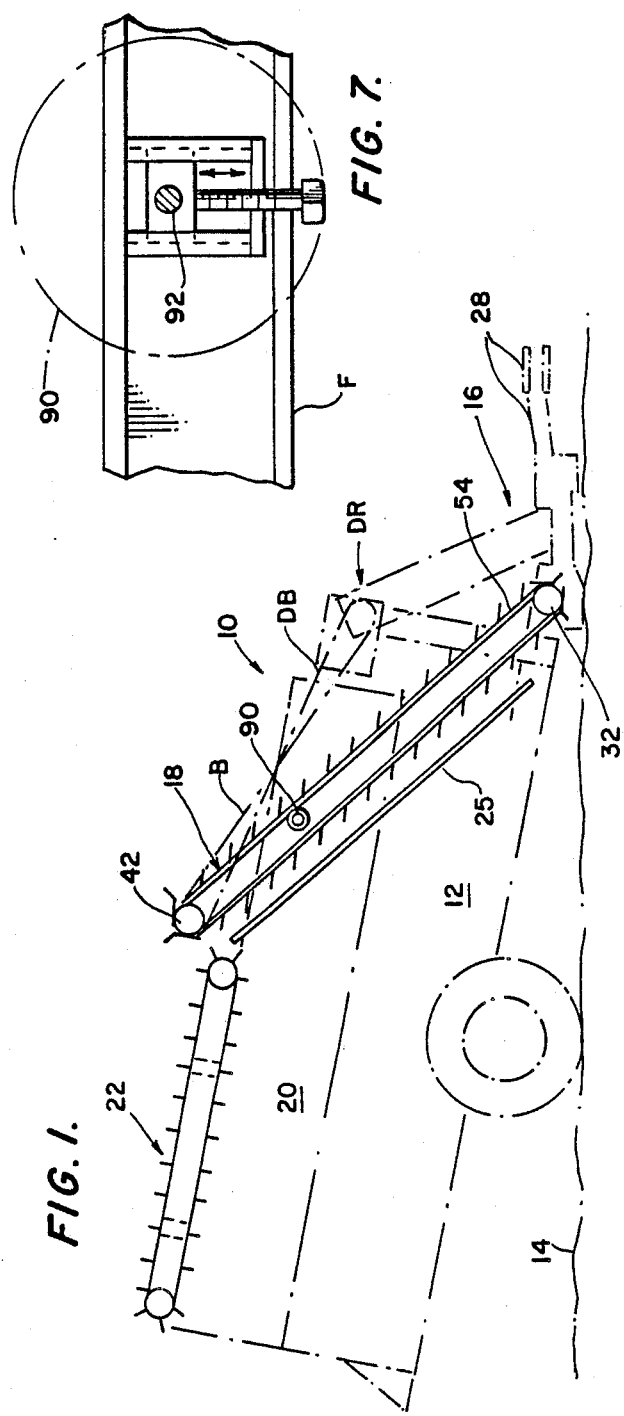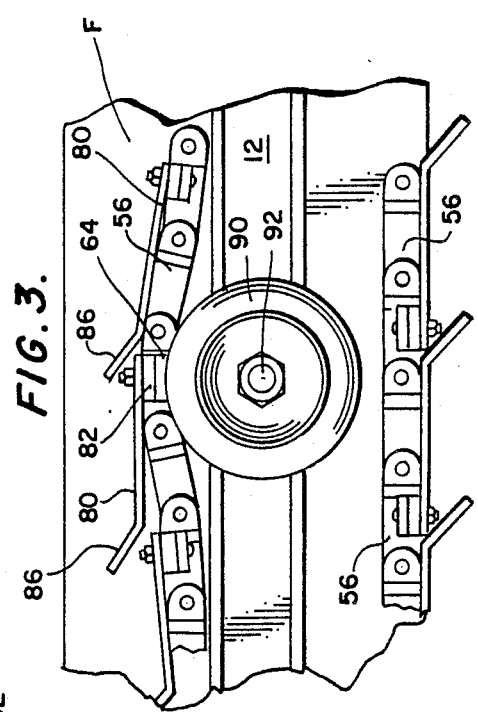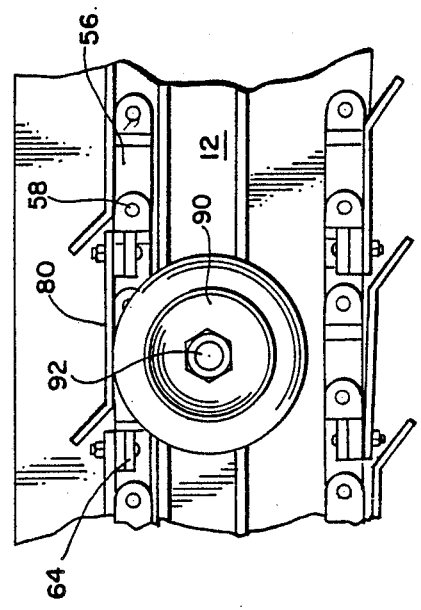

LITTER SCREENING AND SEPARATING APPARATUS

BACKGROUND OF THE INVENTION

1. Field of the Invention

This invention relates generally to machines and apparatus for loading and separating the litter bases normally found in poultry houses.

2. Description of the Prior Art

A common problem with known devices and apparatus for picking up and cleaning out the litter house from a poultry base has been that all of the litter is picked up and removed and an entirely new amount of litter base, such as sawdust, wood shavings and the like, is laid down. However, it is now desirable to reuse the same litter a number of times before it is completely removed.

Another problem with known type pick-up devices is that they do not properly separate the reusable portion of picked up litter from the waste portion thereof. It is very desirable that the waste portion be loaded into a storage or holding container, while the reusable litter is returned to the floor of the poultry house.

SUMMARY OF THE INVENTION

An object of the present invention is to provide an apparatus that will separate the hard crust and litter base in a poultry house and lift the wet material underneath such crust. This material then is moved along a separating path on a conveyor structure having foraminous plates thereon.

Another object of the present invention is to provide structure for aerating picked up litter to get rid of ammonia and damp particles contained therewith.

A further object of the present invention is to provide apparatus for separating dry litter material from material comprising hard and wet lumps and holding the latter and letting the dry litter fall back to the floor of the chicken house.

A still further object of the present invention is to provide apparatus having a storage compartment for holding undesired litter material and thereafter transporting same away.

The present invention is an improvement over applicant's U.S. Pat. No. 3,412,943 (which is specifically incorporated herewith by this reference), and has a number of new and novel features. Among them is the conveyor structure for transporting picked up litter base material from the floor of a poultry house to a storage and holding compartment associated therewith. A pair of parallel chains comprising a plurality of individual links support thereon a plurality of pick-up and separating panels comprising expanded metal plates. Each expanded metal plate is welded to a solid metal bar that is bolted at the respective ends to the pair of chains of the conveyor structure. Each expanded metal plate is only welded to its bar at the front and the trailing edge has an upturned lip provided therewith. The panels are normally disposed flat and in substantially contiguous relationship to one another, defining an essentially continuous support surface for litter deposited on the conveyor. Thus, as the pair of chains rotate around their respective sprockets, and as each panel plate starts around the sprockets at the top of the apparatus, the rear of the pickup panel leaves its normal flat position and moves upwardly, helping to throw the remaining material thereon toward the center of the storage compartment. Again, as the pair of chains start around the lower sprockets holding same, the individual pick-up plates again move from the relatively flat position to one which is tangential to the sprocket circumference, thereby creating an opening which lets any accumulation of material fall to the floor of the poultry house. This, of course, prevents any buildup of waste litter on the lower sprockets of the apparatus.

It is also preferred that the support and attachment bars for the plurality of pick-up plates/panels have small perpendicular pieces of metal welded thereto which protrude approximately 2" outwardly from the plates. The purpose of this is to help move larger lumps of caked litter upwards on the conveyor structure and to prevent them from continuously rolling and bouncing back down the conveyor structure.

In order to increase the screening and separation effect of the present invention, shaker or vibrator rollers are mounted on the underside of the upper half of the pair of conveyor chains. At least one shaker roller is mounted on each side of the apparatus frame so that the chains may be respectively vibrated when needed. Preferably, each roller is mounted in a slot on a pivot structure so that they can be pushed upwardly against the chain when needed and with greater emphasis when more or greater vibration is desired. When the respective shaker rollers are in their operating position, the panel leading edge support bar which is mounted between the pair of chains and is bolted to spaced projections appropriatedly affixed to the chain links hits the rollers, thus effecting a vibration of the chains and panels. The purpose of the upturned lip along the trailing edge of each separating and lifting panel prevents the heavier material from falling off the rear of the panel as it moves in the upward direction as the pair of chains are driven.

It has been discovered that it is far more difficult to let light material fall to the floor than heavy material. However, the apparatus of the present invention is able to accomplish this desired result. The separating and loading panels mounted on the support bars are fastened between the two parallel chains in such a manner that they do not interfere with the chains running smoothly around their support and drive sprockets, and they at all times remain quite flexible.

A catch pan is positioned under the conveyor structure to catch the lighter components of the litter sifting through the conveyor and to distribute the litter evenly back onto the floor of the poultry house. In addition, this panel serves as a front wall of the storage compartment or hopper for the undesirable litter and thus such litter is kept at the rear of the apparatus.

When it is desired to remove all of the litter from the pultry house, solid or imperforate plates are substituted on the conveyor chains for the perforate plates. Thus, dry litter as well as the wetter components are conveyed into the storage compartment or hopper.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of the self-loading litter screening and separating apparatus of the present invention having a tow bar for attachment to a towing vehicle.

FIG. 2 is a fragmentary portion in side elevation and in enlarged detail of the conveyor vibrator roller structure.

FIG. 3 is a view similar to FIG. 2 showing how the vibrator roller effects vibration of the conveyor structure.

FIG. 7 shows an adjustment mechanism which may employed for the rollers.

DESCRIPTION OF THE PREFERRED EMBODIMENT

Figure 4:
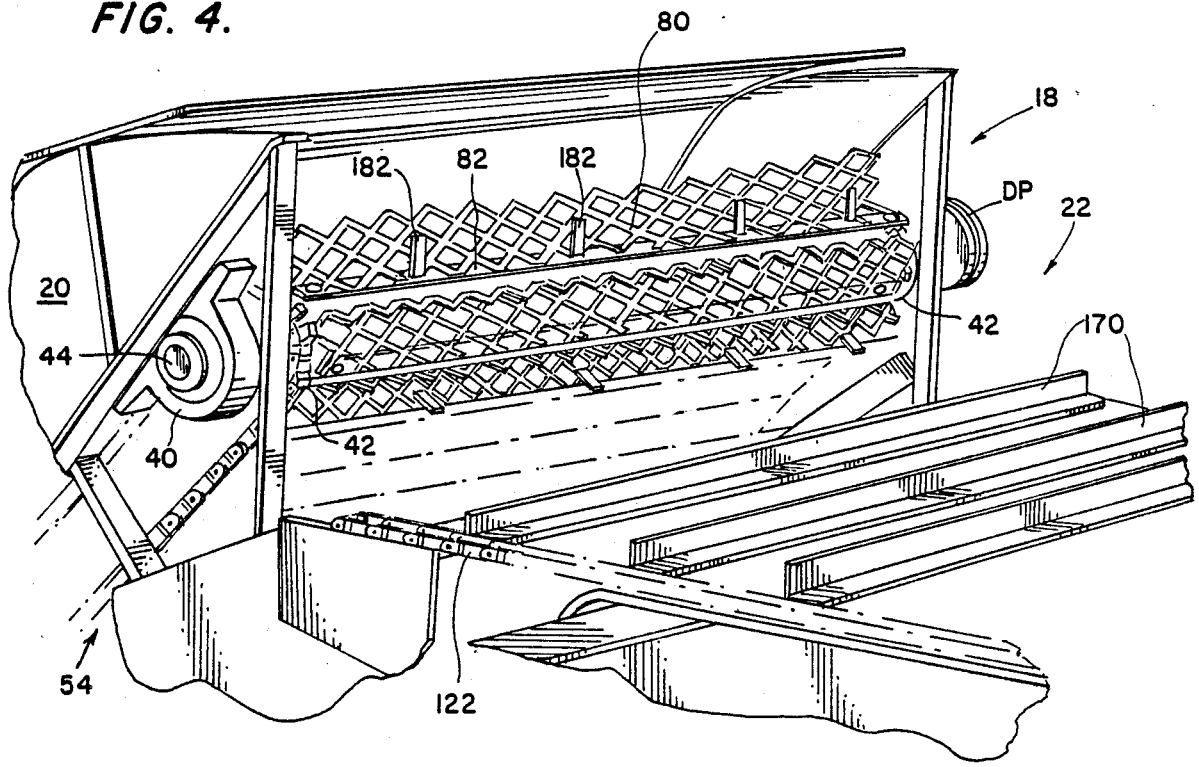
FIG. 4 is a perspective view of the upper portion of the conveyor mechanism of the litter screening and separating apparatus of the present invention.

Referring to FIG. 1 of the drawing, reference numeral 10 indicates in general the apparatus of the present invention. A storage compartment or hopper 12 is provided with scoop or loader means 16 mounted on the front thereof for scraping and picking up encrusted litter material 14 as present on the floor of a poultry house. A conventional type tow bar structure 28 is provided so that the apparatus can be moved across the floor of the poultry house. Primary conveyor structure 18 is mounted obliquely across the front of the apparatus and moves picked up litter material from the scoop or loader means 16 at the front. Litter material is dumped into the upper storage compartment 20 through a horizontal and longitudinal conveyor structure 22 which receives waste material from the upper end of the primary conveyor 18. A catch pan 25 is mounted close to the underside of the primary conveyor structure 18 and for approximately the entire length thereof. The purpose of this catch pan is to ensure that all the light litter material such as sawdust, wood shavings, rice hulls, cut wheat straw, or the like, after being separated and screened from the hard crusted waste material, will be uniformly distributed back to the floor of the poultry house. This catch pan 25 also acts as a divider to separate the forward end of the storage compartment from the conveyor structure 18. A pair of lower conveyor support sprockets 32 and a pair of upper support sprockets 42 provide support for the respective ends of the pair of conveyor chains 54. A drive belt DB between a drive pulley DP for the upper sprockets drive axle 44 and a drive DR provide the power for rotating the pair of conveyor chains. As best seen in the enlarged view of FIG. 4, the drive axle 44 for the sprockets 42 rotatably support and drive same from the drive pulley DP at the one end thereof. Bearings 40 in turn appropriately support the respective ends of drive axle 44.

Figure 5:
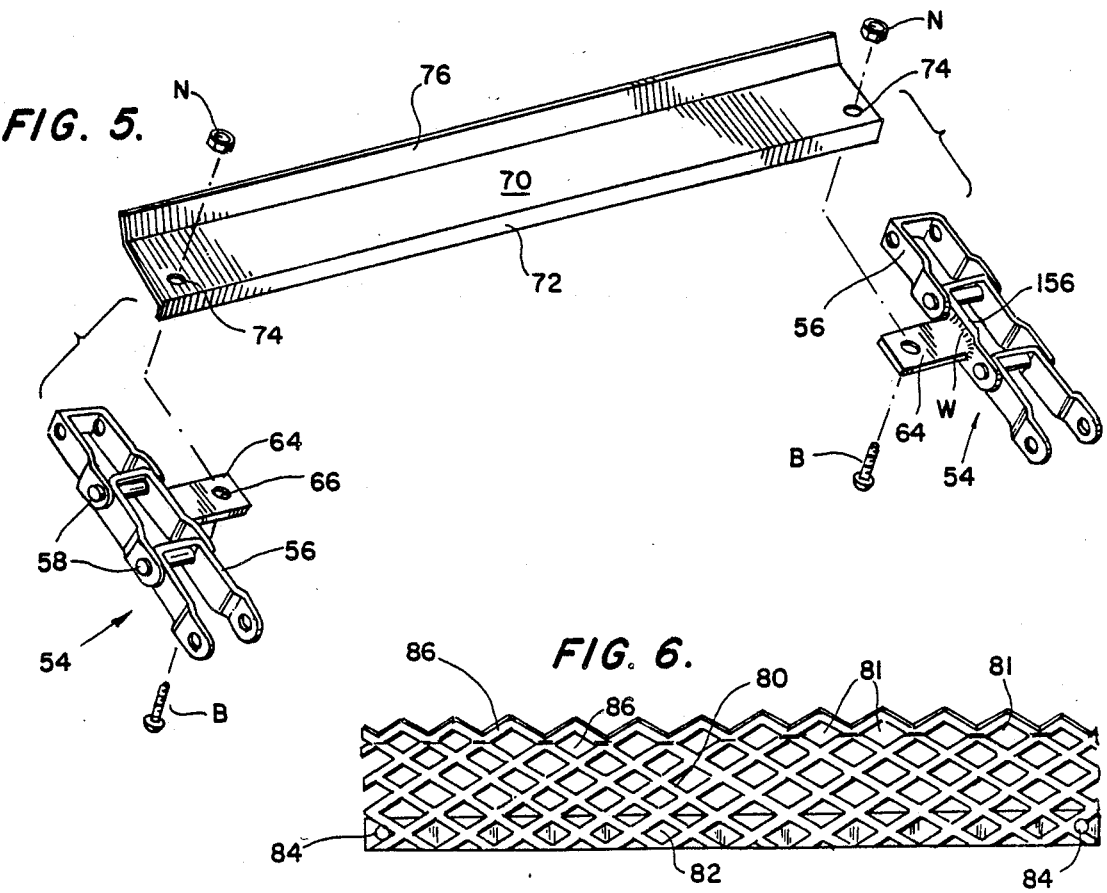
FIG. 5 shows a solid panel loading structure for attachment to the side chains of the conveyor assembly.

FIG. 5 shows in detail the pair of conveyor chains 54. Each conveyor chain has a plurality of links 56 connected together with link pins 58. Provided on some of the links are projections 64 appropriatedly welded W to a side link 156 thereof. Each respective projection 64 has an aperture 66 near the end thereof for receiving the respective ends of separating and/or lifting panels therewith. Appropriated bolts B and nuts N removably affix these panels to the pair of conveyor chains. As shown in FIG. 5, a solid lifting panel 70 has a downwardly turned reinforcing lip 72 at the front thereof and an upwardly angled lip 76 along the trailing edge thereof. When using a solid panel such as shown in FIG. 5, i.e., panel 70, all of the picked up litter material can be loaded into the storage compartment 20.

Figure 6:
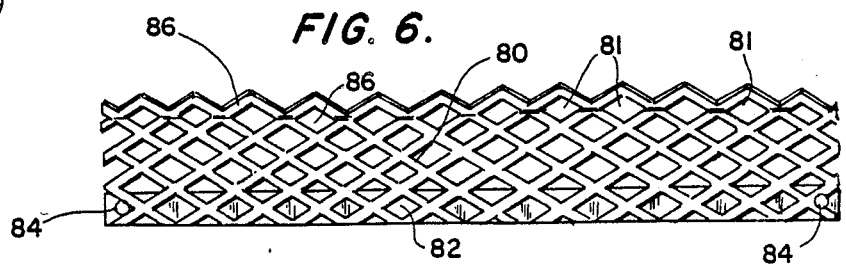
FIG. 6 shows the perforated panel like that depicted in FIG. 4.

However, when the foraminous surface plate panel 80 (FIG. 6) of the present invention is mounted between the pair of conveyor chains, the desired benefits and results of the present invention are utilized and achieved. The separating and lifting panel 80 is formed of expanded metal provided with a plurality of relatively large openings 81. The leading edge of this perforated panel is welded as appropriate to a support bar 82 having apertures 84 at the respective ends thereof. These apertures permit this perforated panel to be attached to the projection 64 as provided along the pair of conveyor chains 54 at desired intervals.

It should also be noted that the trailing edge of the perforated panel 80 is preferably provided with an upwardly angled lip portion 86 to correspond with the one 76 of the solid panel. The purpose of lips 76 and 86 is to prevent large pieces of encrusted litter material from dropping back to the pick-up point of conveyor 18 near the lower sprockets 32 as seen in FIG. 1.

A very important feature of the present arrangement is that with the front support bar 82, or the front portion 72 of solid panel 70, whichever one is in place, mounted between the pair of conveyor chains 54, as best seen in FIG. 1, when the moving end of the conveyor 18 reaches the upper sprockets 42 and as the respective chains move around these sprockets, the rear lips 76, or 86, will be thrown or flipped upwardly and forwardly (with respect to the direction of movement of the conveyor) and thus tend to toss the undesired material onto the secondary conveyor structure 22. Also, where cost is an important consideration, the second conveyor 22 may be omitted and the primary conveyor 18 can toss the undesired material directly into storage compartment 20.

In order to increase the effectiveness of the screening and separating of litter by the perforated plates 80 as they move upwardly along the upper surface of the conveyor structure, at least one vibrating roller 90 is provided underneath and adjacent each of the respective conveyor chains 54. Each vibrating roller 90 is carried by an axle 92 mounted upon the side frames of the apparatus as shown in enlarged detail in FIGS. 2 and 3. Preferably, either an adjustable mount or a movable mount is included for each roller so that same can be easily moved into operating position as desired. In FIG. 7, this adjustable mount is seen as comprising a channel member 93 in which a block 94 is adjustable by means of bolt 95. The axles 92 for the rollers 90 are carried by the block 94. Both FIGS. 2 and 3 show the roller after being moved into operating position. The view of FIG. 2 shows how the flat surface of the separating panels 80, or 70, move along close to the circumferential edge of the roller 90. When the projections 64 which support and hold the panel bar 82 therewith move into position from that of FIG. 2 to that of FIG. 3, the associated panel 80 will be jarred and vibrated. Thus, as each respective panel moves into position adjacent shaker rollers 90, that panel will be vibrated or jostled. The axles 92 shown in these figures rotatably support the rollers 90 thereon.

As best seen in FIG. 4, short perpendicular projecting members 182 are preferably welded along the panel support bar 82 to help move larger lumps of caked litter upwards on the conveyor structure so that they do not continuously keep rolling or bouncing back down the conveyor.

In summary, the apparatus of the present invention offers a new and desired flexibility to the keeping of poultry. People in this industry have now learned that a well kept litter base in a broiler and pullet house is essential to better and cheaper poultry product. The present invention does this very well.

Former machines were used to clain out all of the litter from broiler houses after each batch of chickens reached their desired weight and were taken to market. However, today it is very desirable that the same litter be used several times before it is completely removed. This is where the apparatus of the present invention is most effective.

Considering the condition of a poultry house after all birds have been removed, on the basically level dirt floor litter material, including sawdust, wood shavings, rice hulls or cut wheat straw, has been evenly laid out about 6" deep. This was originally done prior to starting the baby chickens on feed and water. After six to eight weeks of feeding and watering, the 20,000 to 40,000 birds in the house have thoroughly contaminated and encrusted this litter material. The litter material underneath and on each side of the water fountains, for example, is very crusty and very hard. This is due to the droppings from the chickens mixing with water which they waste at the water fountain. Both of these mix with the litter and make it hard and crusty. In addition, there are many other variables that can produce encrusted cakes and wet conditions in a poultry house, as for example, a leaking water fountain or excess rain from outside which leaks into the house. In addition, a specific type of floor, whether of clay, sand or other material, and, of course, any improper drainage adjacent the poultry house, are factors. Of course, excess moisture produces ammonia when mixed with the droppings, etc., which also is a haven for bacteria and disease. Any of the foregoing can cause many problems with baby chicks.

By moving the present apparatus around the floor of the poultry house, the front scoop will break up and lift up the encrusted litter material. As the litter material is broken up it moves rearwardly of the loading structure, and then moves onto the front of the primary conveyor structure of the present invention. Using the expanded metal separating and lifting panels as described above, the machine can separate and screen out the light litter particles which are desired and should be returned to the poultry house floor, while continuing to convey the heavy wet and encrusted particles to the storage compartment for removal from the chicken house. Of course, while only one size of expanded metal panels has been shown in FIG. 6, various sizes of panels may be provided for successfully and most efficiently working with different types of litter material.

Alternately, when it is desired to remove all of the litter from the poultry house, the solid panels 70 are substituted for the perforated panels 80.

These together with other objects and advantages which will become subsequently apparent reside in the details of construction and operation as more fully hereinafter described and claimed, reference being had to the accompanying drawings forming a part hereof, wherein like numerals refer to like parts throughout.

We claim:

1. In a litter screening and separating apparatus movable along the floor of a poultry house for engaging and lifting litter from the floor, wherein said apparatus has a scoop means on a front portion thereof for scooping up said litter, a storage compartment for receiving and storing litter scooped up by the scoop means, and an upwardly and rearwardly inclined conveyor means extending from a first end adjacent to the scoop means to a second end adjacent to the storage compartment for conveying litter from the scoop means to the storage compartment, the improvement comprising:

a plurality of replaceable individual panel means having opposite ends thereof removably attached to and carried by flexible chains of the conveyor means, and with said chains define said conveyor means, said panel means having a leading edge and a trailing edge and being attached at the leading edge to said chains, said panel means having a width and being attached to said chains in spaced relation to one another along said chains such that when the panel means are moving along flight of said conveyor means the panel means lie flat and in substantially contiguous relationship with one another, defining an essentially continuous support surface for said litter, but when the panel means move around the second end of the conveyor means the trailing edge of the panel means flip upwardly, throwing litter carried thereby into said storage compartment, the trailing edge of said panel means having an upturned portion to enhance the throwing action and to assist in retaining litter on the panel means as they move up the inclined conveyor means, said panel means having opening means therethrough for enabling smaller particles of litter to pass therethrough while retaining larger particles of litter on the conveyor means.

2. In a litter screening and separating apparatus movable along the floor of a poultry house for engaging and lifting litter from the floor, wherein said apparatus has a scoop means on a front portion thereof for scooping up said litter, a storage compartment for receiving and storing litter scooped up by the scoop means, and an upwardly and rearwardly inclined conveyor means extending from a first end adjacent to the scoop means to a second end adjacent to the storage compartment for conveying litter from the scoop means to the storage compartment, the improvement comprising:

said apparatus being operable in either one of two modes, including a first mode wherein a plurality of individual, removable and replaceable perforate panels are releasably secured at their opposite ends on a flexible chains and with said chains define said conveyor means, said perforate panels defining a foraminous surface for screening of litter conveyed thereon for return of smaller dry pieces of litter to the floor of a poultry house and conveyance of larger wet pieces of litter to the storage means, and a second mode wherein a plurality of individual, removable and replaceable imperforate panels are releasably secured at their opposite ends to said flexible chains, defining an imperforate surface for support and conveyance into the storage compartment of all litter scooped from the floor of the poultry house.

3. A litter screening and separating apparatus as claimed in claim 2 wherein:

said panels have a leading edge and a trailing edge and are attached at the leading edge to said chains for pivotal movement of the panels about an axis defined by the leading edge.

4. A litter screening and separating apparatus as claimed in claim 2, wherein:
   said panels have a leading edge and a trailing edge and are attached at the leading edge to said chains, said panels having a width and being attached to said chains in spaced relation to one another along said chains such that when the panels are moving along a flight of said conveyor means the panels lie flat and in contiguous relationship with one another, defining an essentially continuous support surface for said litter, but when the panels move around the second end of the conveyor means the trailing edge of the panels flip forwardly and upwardly, throwing litter carried thereby into said storage compartment, the trailing edge of said panels having an upturned portion to enhance the throwing action and to assist in retaining litter on the panels as they move up the inclined conveyor means.

5. A litter screening and separating apparatus as claimed in claim 4, wherein:
   the chains comprise a plurality of interconnected chain links, some of said chain links having lateral projections thereon, and said panels being removably secured to said chains by removable fasteners connected between the panels and the projections on the chain links.

6. A litter screening and separating apparatus as claimed in claim 2, wherein:
   said panels have a leading edge and a trailing edge and are attached at the leading edge to said chains, said panels having a width and being attached to said chains in spaced relation to one another along said chains such that when the panels are moving along a flight of said conveyor means the panels lie flat and in contiguous relationship with one another, defining an essentially continuous support surface for said litter, but when the panels move around the second end of the conveyor means the trailing edge of the panel flip forwardly and upwardly, throwing litter carried thereby into said storage compartment, the trailing edge of said panels having an upturned portion to enhance the throwing action and to assist in retaining litter on the panels as they move up the inclined conveyor means.

7. A litter screening and separating apparatus as claimed in claim 6, wherein:
   rollers are positioned adjacent to said conveyor means to engage the panels as they move along the conveyor means for vibrating the conveyor means to cause the smaller dry particles of litter to sift through the foraminous panels and return to the floor of the poultry house.

8. A litter screening and separating apparatus as claimed in claim 7, wherein:
   said rollers are adjustably mounted whereby they are movable closer to or farther away from the conveyor to impart more or less vibration to the conveyor to suit conditions encountered.

9. A litter screening and separating apparatus as claimed in claim 7, wherein:
   an inclined catch pan is supported beneath said conveyor means to catch litter sifted therethrough for return of the litter in an evenly distributed manner on the floor of the poultry house.

10. A litter screening and separating apparatus as claimed in claim 9, wherein:
    the chains comprise a plurality of interconnected clain links, some of said chain links having lateral projections thereon, and said panels being removably secured to said chains by removable fasteners connected between the panels and the projections on the chain links.

* * * * *